United States Patent [19]

Widdowson

[11] Patent Number: 4,572,062
[45] Date of Patent: Feb. 25, 1986

[54] ROTISSERIE GRILL

[76] Inventor: Richard E. Widdowson, 1620 Maplegrove Ave., Dayton, Ohio 45414

[21] Appl. No.: 689,424

[22] Filed: Jan. 7, 1985

[51] Int. Cl.⁴ ............................................. A47J 37/04
[52] U.S. Cl. ...................................... 99/345; 99/340; 99/421 H; 99/447; 126/25 A; 403/351
[58] Field of Search ................. 99/419, 421 R, 421 H, 99/340, 345, 355, 447; 126/25 R, 25 A; 426/523; 403/350, 351

[56] References Cited

U.S. PATENT DOCUMENTS

| | | | |
|---|---|---|---|
| 2,059,666 | 11/1936 | Thompson | 99/345 |
| 2,116,310 | 5/1938 | Harvey | 99/421 R X |
| 3,143,003 | 8/1964 | Schmitt | 99/421 H X |
| 3,943,837 | 3/1976 | Trkla | 99/421 H X |
| 4,061,083 | 12/1977 | Caliva | 99/421 H X |

FOREIGN PATENT DOCUMENTS

| | | | |
|---|---|---|---|
| 0486795 | 9/1977 | Australia | 99/421 H |
| 2628533 | 5/1978 | Fed. Rep. of Germany | 99/421 H |

Primary Examiner—Billy J. Wilhite
Attorney, Agent, or Firm—Biebel, French & Nauman

[57] ABSTRACT

A roasting machine for roasting relatively large items of food, such as small pigs or the like, includes a pair of side frame members by means of which the roasting machine may be supported for transportation along the ground or rested on the ground. A pair of end supports are secured to the side frame members and have notches which carry handlebars, which handlebars in turn carry a suspended firebox between the side frame members. The spit includes a hollow drum which receives the legs of H-shaped wire skewers to support the food on the spit. A special clamp mechanism is provided for retaining the spit drum on the support rod.

13 Claims, 9 Drawing Figures

ROTISSERIE GRILL

Background of the Invention

This invention relates to a rotisserie grill and more particularly to a portable rotisserie or roaster machine which is adapted for roasting relatively large items of food, such as small pigs or the like, on a rotating spit.

SUMMARY OF THE INVENTION

A pig roaster is shown, employing a rotary spit, which may be used for roasting or cooking meat items or the like, other than pigs. The device consists of a roasting machine or a rotisserie-grill which is adapted for outdoor usage, and which is generally portable in that it may readily be moved from place to place. The roasting machine is characterized by the employment of a pair of side frame members in generally parallel relation to each other, with terminal ends which extend downwardly for ground support. An axle and wheels may be provided at one end of the frames and a downward loop at the other end which extends upwardly to a pair of handles. An ash pan interconnects the parallel frame members, and is positioned beneath a generally rectangularly-shaped firebox. The firebox is suspended on a pair of handlebars from end supports extending between the frame members. The end supports form support frames which, in turn, are provided with a plurality of vertically spaced handlebar receiving recesses, by means of which the handlebars, on either side of the firebox, may be supported in selectively elevated positions with respect to the frame and the ash pan.

The vertical end supports also rotatably support therebetween a removable spit assembly which is driven by a gear reduction motor mounted on one of the end supports. The spit assembly includes a longitudinally extending shaft which carries a hollow cylindrical spit in the form of a drum, in elevated relation to the firebox. The drum itself is preferably formed of stain resistant material, such as stainless steel, and advantageously is provided with a plurality of openings through the wall thereof through which skewers of a special design may be received for securing the food, such as meat, in place on the spit. The hollow interior of the drum advantageously also provides a space into which condiments such as spices, garlic, onions, cloves or other ingredients may be added for infusion into a meat product being cooked on the spit.

A further aspect of the invention consists of a novel arrangement by means of which a hollow cylindrical member, such as a spit, may be securely attached to a shaft which extends co-axially therethrough or therefrom. To this end, a plurality of discs are provided which have a central opening for receiving the shaft, and which have outer circumferences which form a relatively close fit with the interior surface of the hollow member. The discs are pivoted together at a common point radially offset from the central axis, and an actuator in the form of a screw and nut combination is selectively attached to alternate discs or pairs of discs in such a manner that at least one disc is biased in one transverse direction while the adjacent disc is biased in the opposite direction, causing the discs to rigidly grip the shaft at the central opening, while at the same time causing the periphery of the discs to be cammed into engagement with the inside surface of the hollow member. In the preferred embodiment, four discs are stacked, with the two outer discs being caused to move in one transverse relation with respect to the two inner discs. The arrangement has particular advantage in providing a quick disconnect for a hollow drum-like spit with respect to its support and drive shaft by means of which the parts may be readily disassembled for cleaning and readily assembled and positioned along the shaft for use, and by means of which a drum may be rigidly attached to the shaft.

The firebox of the roasting machine also has unique features. First, the firebox is formed with sloping sides which tend to reflect the heat inwardly and upwardly to the product being cooked. The firebox has a bottom in which a pattern of vent openings are formed, and a damper plate is carried adjacent the bottom and which is also formed with a pattern of vent openings which are selectively alignable with the openings in the bottom of the firebox.

The damper plate, the preferred form, is formed with a pair of arms which extend upwardly along the sloping sides of the firebox and which support the damper plate for sliding movement, and by means of which the damper plate may be moved when there are coals resting on the damper plate. Preferably, an open mesh wire platform is carried on the upper surface of the damper plate, which in turn supports the fuel, which may be charcoal.

As previously noted, the spit drum is provided with a plurality of openings which are adapted to receive the legs of specially designed skewers. The skewers are formed of bent wire in a generally H-shape, with spreadapart legs proportioned to be received within pairs of the openings and with a portion of the skewer positioned externally of the drum when so inserted for retaining meat for other food products on the drum or the spit. The upper portion of the skewer is formed with a loop which provides a convenient means by which the skewer can be gripped for insertion and removal, and the legs are atached by means of spring loop attachments and are provided with serrations or indentations so that the skewer is self-adhering to the drum at a plurality of depths of insertion.

The entire rotisserie machine may be conveniently moved from place to place by lifting on the end frames, which are provided with rearwardly directed handles, and rolled about on its forwardly located wheels. The frames, at the handle portions, provide a convenient place for the attachment of a platform or pan which may hold dishes, barbecue sauce, or the like when in use.

The firebox which is readily movable into selected vertical positions with respect to the spit, may be easily handled even during the roasting process, by raising or lowering the handlebars on the notches provided in the end supports, for controlling the heat and the rate of cooking. A generally inverted U-shaped hood covers the assembly and reflects heat backward and downward into the food products, while permitting smoke and the like to escape around the bottom edges.

It is accordingly an object of this invention to provide a roasting machine for roasting relatively large items of food, such as small pigs and the like, in which a generally hollow roasting spit is mounted for rotation above an adjustable fire pit or firebox and in which the entire assembly is mounted on a pair of side frames which have ground-engaging portions for ease of transportation.

A further object of the invention is the provision of a spit having a novel arrangement for removably attaching a hollow drum to a support shaft.

Another object of the invention is the provision of an effective and easy to use clamp by means of which a rod may be attached to a cylinder.

A still further object of the invention is the provision of a rotisserie roasting machine having a hollow spit, and skewers having pairs of legs adapted to be received in corresponding pairs of openings in the spit for attaching meat products thereto.

A still further object of the invention is the provision of a roasting machine by means of which a firebox may be readily moved to selected elevated positions with respect to a rotating spit.

These and other objects and advantages of the invention will be apparent from the following description, the accompanying drawings, and the appended claims.

DESCRIPTION OF PREFERRED EMBODIMENT

Figure 1:
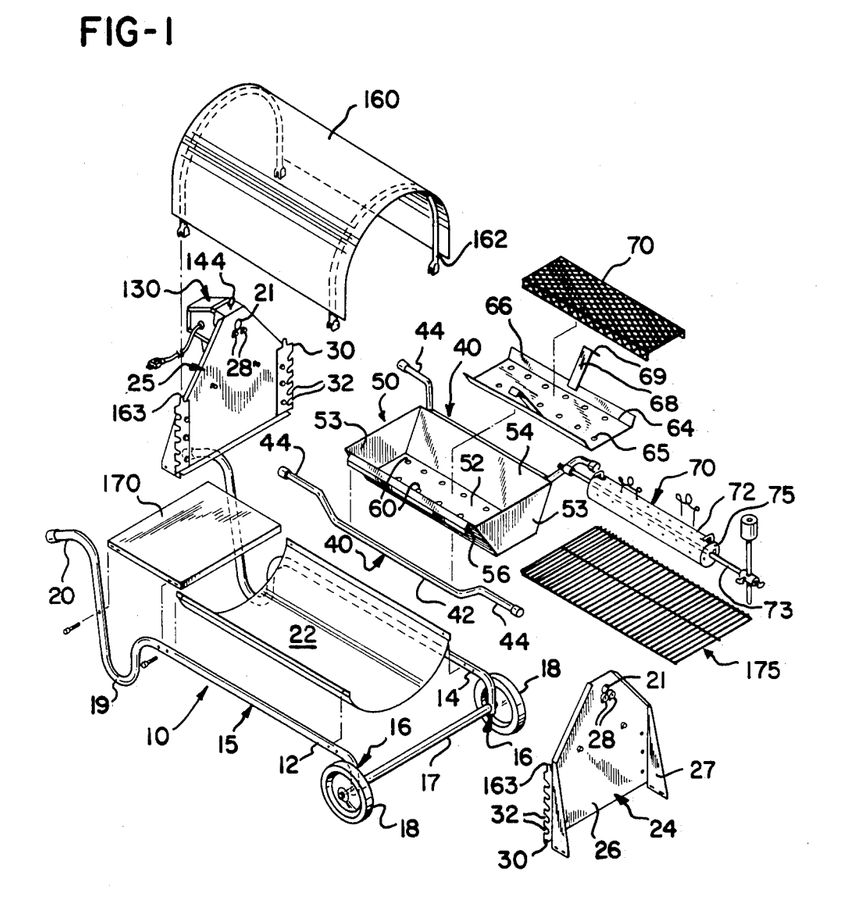
FIG. 1 is an exploded view, in perspective, of a roasting machine made in accordance with this invention.

Referring to the figures of the drawing, which illustrate a preferred embodiment of the invention, a roasting machine for roasting relatively large items of food, such as small pigs or the like, on a rotating roasting spit is shown generally in FIG. 1 as including a frame 10. The frame 10 is formed by a pair of tubular side frame members 12 and 14 which extend in generally parallel relation to each other. The side frame members 12 and 14, which may be identical to each other, are formed with a generally horizontally extending parallel center support rung or sections 15 and downwardly turned forward ends 16. These ends are pierced to receive an axle 17 and a pair of ground-engaging wheels 18 by means of which the frame 10 may be supported above the ground. The rearward end of each frame member is looped or turned downwardly at 19 to form ground-engaging portions, with upwardly extending handles 20. The handles 20 extend up and rearwardly to a level above the center portions 15 so that the ends of the handles may be conveniently gripped by a person standing behind the roaster, by lifting, and then walking forward or backward to carry the same along on its wheels 18.

A semi-circular sheet metal ash pan 22 extends between the horizontal side frame members 15, to catch any ashes or sparks which may be dropped.

The frame 10 further includes a pair of generally upwardly extending, transversely spaced-apart end supports 24 and 25. The end supports extend between the side frame members 12 and 14, at the remote ends of the horizontal sections 15. The end supports 24 and 25, which may be essentially formed as identical parts, each has a central panel section 26 and a pair of side gusset plates 27 which are joined by suitable fasteners to the horizontal section 15 of the frame members 12 and 14, for support. The central panel sections 26 have a truncated upper end which is apertured as shown at 21 for the purpose of receiving the support rod of the spit. A pair of support rollers 28 are positioned adjacent the aperture 21 for supporting the weight of the spit rod or shaft, and permit the same to turn freely.

The vertical sides of each of the end supports is provided with an outwardly directed flange 30 into which a series of vertically spaced notches 32 are formed. The notches are proportioned to receive the ends of a pair of handlebars 40. The handlebars are formed of tubing material and are crank shaped to include a central section straight 42 and offset ends 44 which form hand grips. The ends 44 are proportioned to be received in opposite pairs of notches 32 on each of the end supports, for the purpose of supporting a firebox 50 therebetween in selected elevated positions.

The firebox 50 is generally rectangularly shaped, and is formed with a bottom 52, vertical ends walls 53, and sloping side walls 54. The sloping side walls 54 join with the ends and with the bottom to form a box-like structure which is wider at the top than at the bottom. The side walls 54 have the additional function of being angled to give better reflection and direction to the heat on the food being cooked or processed, and terminate in upper looped or curved ends 56 which are proportioned to be received on the central sections 42 of the handle bars 40 and carried thereon. Thus, when the handle bar ends 44 are suspended on the end supports, in one of the notches 32, the firebox 50 is slung or suspended on the handlebars and in elevated relation to the ash pan 22. The firebox may be simply elevated or lowered with respect to the frame merely by raising or lowering the same on either side by gripping the ends 44 of the handlebars and lifting the same out of one set of the notches 32 to another set in either higher or lower relationship.

The bottom 52 of the firebox 50 is provided with a pattern of individual vent openings, formed as circular holes 60. A damper plate 64 is formed with a corresponding pattern of damper or vent openings 65, corresponding to the shape and spacing of the vent openings 60. The damper plate 64 is formed with a longitudinal length which is somewhat less than the length of the bottom 52 between the end walls 53, so that the damper plate may be slid or moved to provide selective registration of the damper openings or holes and the vent holes. For this purpose, a damper plate 64 is provided with a pair of side arms 68, the upper ends of which are downwardly turned at 69 to ride on and slide along the curved upper ends 56 of the firebox 50. Thus, the arm ends 69 are exposed and remain relatively cool so that the entire damper plate 64 may be moved as desired to increase, decrease or even terminate the flow of air to the fire in the firebox. An open mesh wire platform 70, with downwardly turned side edges, may be carried on the upper surface of the damper plate 64, for the purpose of forming a coal-supporting bed in the firebox 50. Further, the sides 66 of the damper 64, which are angled upwardly at the same angle as the sides 54 of the firebox, provide an extra wall of steel within the firebox to protect the same against burnout. Ashes from the firebox 50 may be removed simply by lifting the entire firebox out by means of the handlebars 40 for dumping at a safe location.

The rotisserie spit is illustrated generally at 70, and includes a stainless hollow drum 72 and a coaxially extending shaft or rod 73, joined to the drum 72. The rod 73 is proportioned to extend through the previously mentioned openings 21 formed in the end supports 24 and 25 and rides on the rollers 28.

Figure 2:
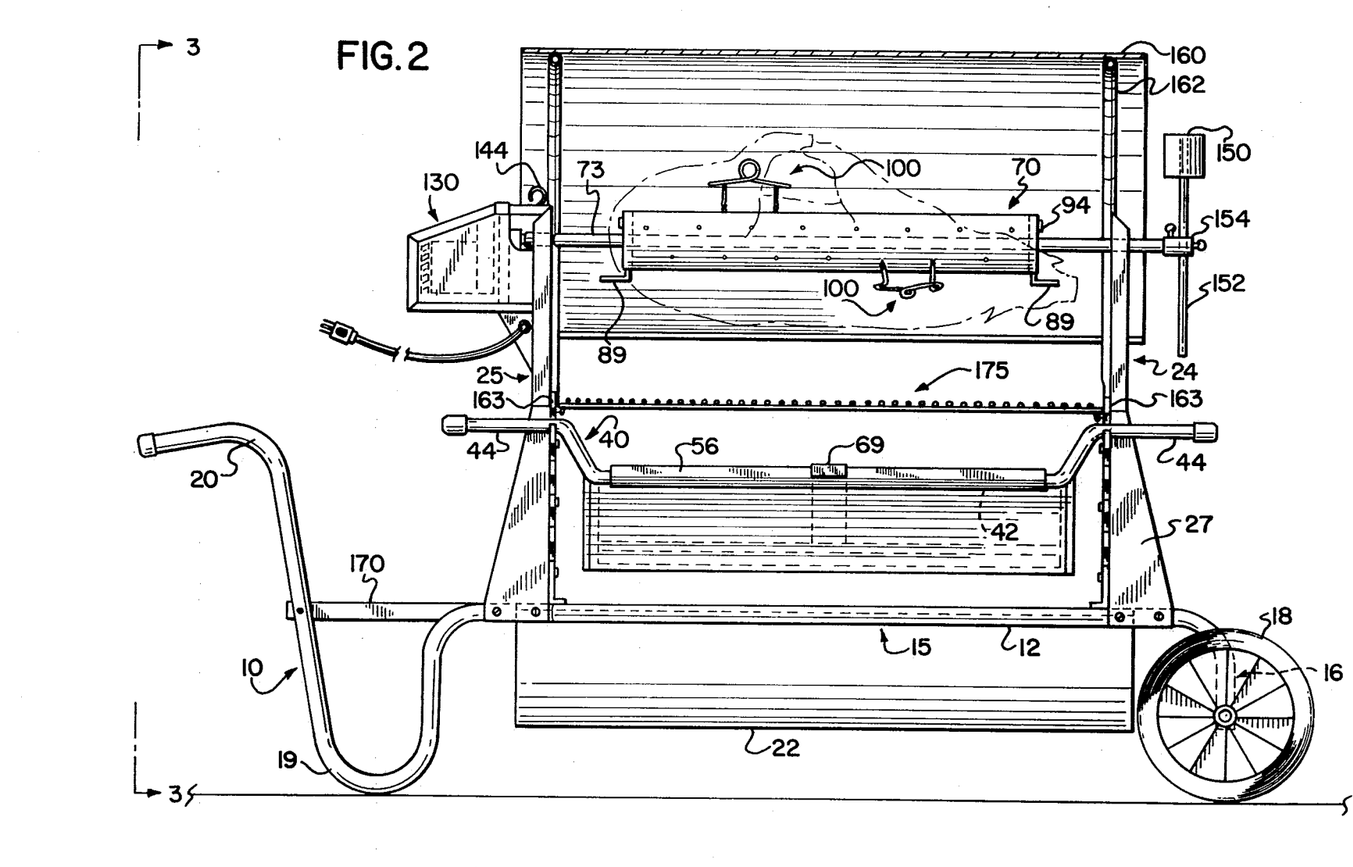
FIG. 2 is an enlarged side elevation of the roasting machine, with certain of the parts being broken away for clarity.
Figure 3:
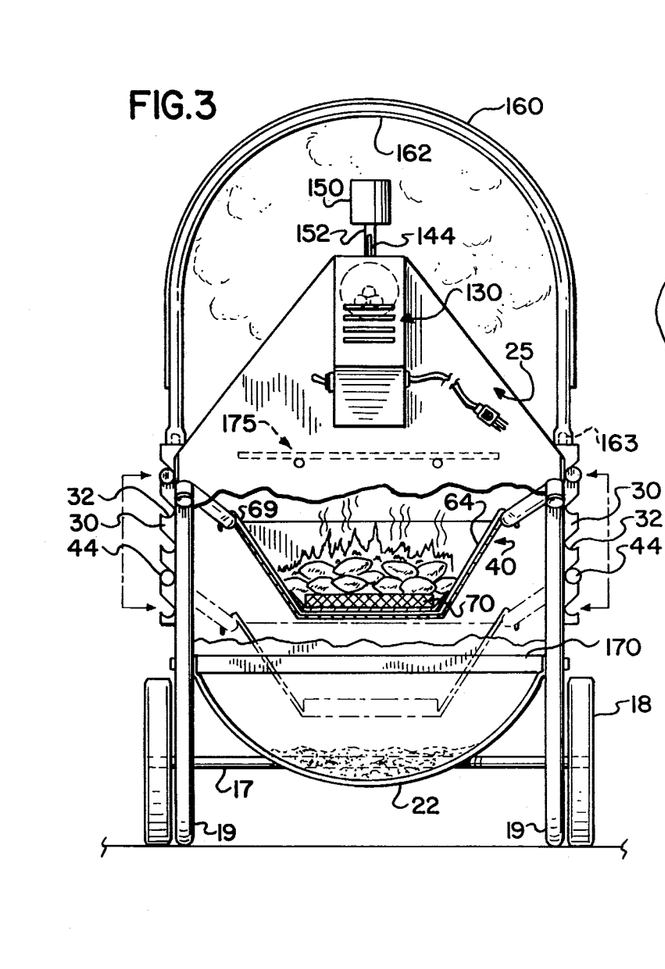
FIG. 3 is an end elevation of the roasting machine.

The hollow drum 72 is in effect a longitudinally extending cylinder with a support rod 73 extending axially therethrough. Clamp means 75, described in greater detail in connection with FIGS. 5 and 6, removably join the drum 72 to the rod 73. In position, the drum 72 is elevated above the firebox 50 for supporting whatever food is to be roasted, as illustrated in FIG. 2 by the outline of the small pig. The drum 72, as noted, is hollow and is provided with a plurality of openings 78 extending therethrough into the interior. The hollow interior of the drum 72 may contain condiments which may be useful to the cooking process, such as herbs and spices or the like, which will be heated by the firebox and the vapors effused through the food products carried on the spit.

Figure 4:
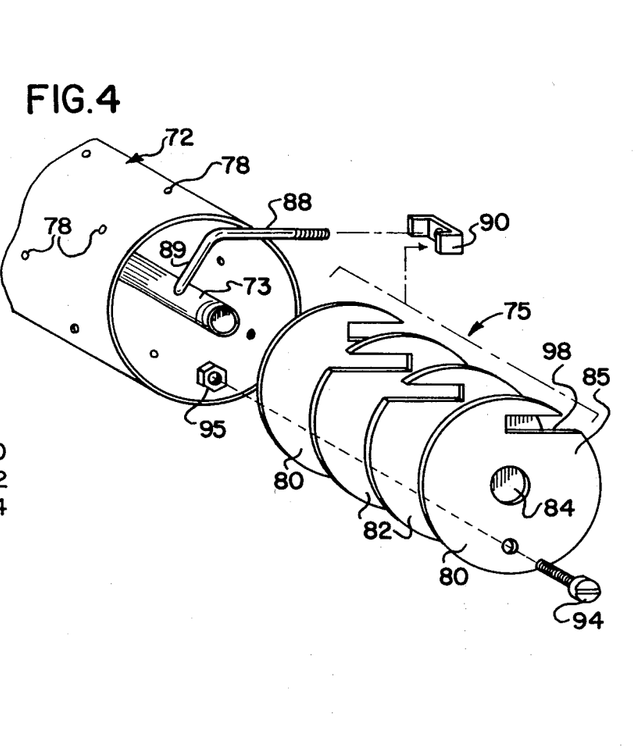
FIG. 4 is an exploded view showing the apparatus for connecting the hollow spit drum to the support rod.
Figure 5:
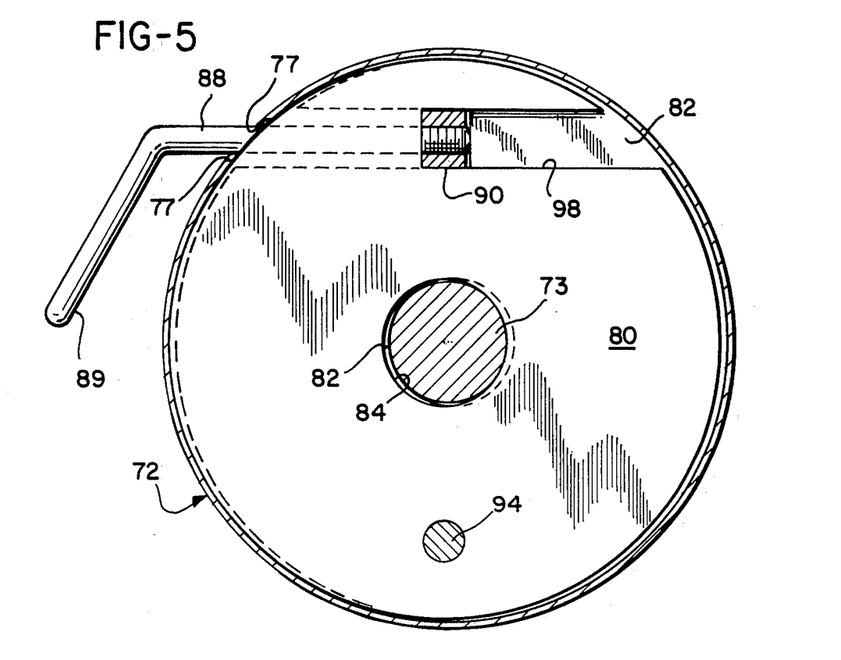
FIG. 5 is an enlarged transverse sectional view through the connecting mechanism as shown in FIG. 4.

The clamp 75 is shown in greater detail in FIGS. 4 and 5 as including a plurality of annular hub plates including a pair of outer hub plates 80 and a pair of inner hub plates 82, making four plates in all in the preferred embodiment, although a greater or fewer number of plates may be used. The plates 80 and 82 may be identically formed and then assembled as shown in FIG. 5 to make up the clamp.

Each of the hub plates has an inner or central opening 84 which is proportioned to form a relatively close fit with the outer surface of the shaft or rod 73, and further has an outer circumference 85 which forms a relatively close fit with the inside surface of the drum 72. The opposite ends of the drum are notched as at 77 (FIG. 5) to receive a threaded actuator screw 88 having an outer end 89 which may be readily gripped for turning. A generally U-shaped nut 90 is threadedly attached to the inner end of the screw 88.

The pairs of plates 80 and 82 are pivoted together in common at a radially offset position with respect to the center line of the shaft, at a common pivotal connection, such as a screw 94 and nut 95. The plates 82 and 84 are each formed with chordwise-extending slots 98 which are positioned so that the slots of the outer plates 80 face in one direction and the slots of the inner plate or plates face in the opposite direction. The slots 98 are proportioned to receive the body nut 90, and the central threaded opening of the nut 90 assures that the end of the screw 88 bears upon the inner end or bottom of the slots 98 in the inner plates 82, while the nut 90 itself bears upon the bottom of the slots 98 in the outer plates.

The apparatus just described provides a highly effective and simple clamp mechanism for connecting a cylinder to a rod which extends coaxially of or into an end of a cylinder. At least two stacked discs should be used so that a screw can bear on one and a nut on the other. In the preferred embodiment, the two center or inner plates may be formed as a single plate, but two plates are used to provide a desired thickness or width to assure contact with the end of the screw 88. The two outer plates provide balance of force on the nut as well as on the rod or shaft to be clamped. When the screw 88 is rotated, the two outer plates are caused to move in one direction about the offset pivot while the two inner plates are caused to move in the opposite direction. The plates at the central opening are brought into camming engagement with the rod, thereby effectively clamping or camming the plates onto the surface of the rod or shaft at the central opening. Simultaneously, outer circumferences of the plates are cammed into the engagement with the inside surface of the cylinder. When it is desired to remove the drum or cylinder, the screws 88 are simply hand loosened permitting the same to be slid off of the end of the supporting rod.

Figure 6:
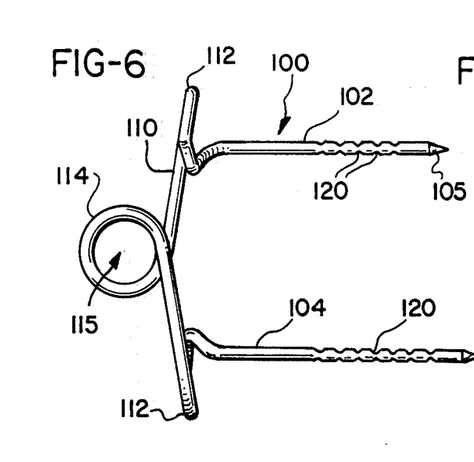
FIG. 6 is a side elevation of one of the skewers.
Figure 7:
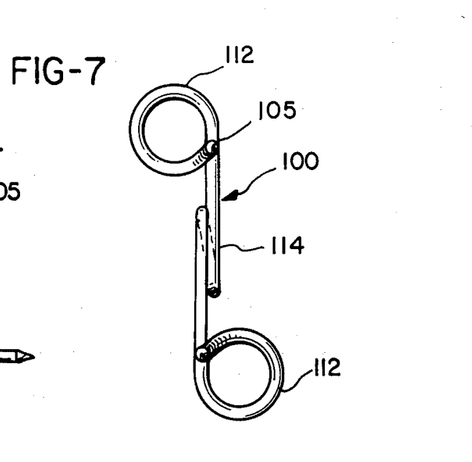
FIG. 7 is an end elevation thereof.

The drum openings 78 are proportioned to receive the legs of especially designed wire skewers 100, as shown in FIGS. 6 and 7. Skewers 100 are generally H-shaped with a pair of generally parallel, spaced-apart legs 102, 104 with pointed ends 105. The spacing between the legs is such that the legs may be received within a pair of the drum openings, as shown in FIG. 2. The legs 102 and 104 are joined together at a common section 110, through transverse loops 112. The common section 110 in turn is formed with an outer loop 114 which forms a finger-opening 115 by means of which the skewer 100 may be conveniently grasped for insertion and removal. The loops 112 turn in opposite right and left-hand directions to provide symmetry to the skewer and to permit flexing inwardly and outwardly of the legs 102, 104 without permanent deformation or bending of the metal. Further, the loops 112 provide food-retaining surfaces which, together with a central or common section 110, may be pressed into the meat for holding the same on the spit. Each of the legs 102 or 104 is provided with a series of opposed indentations or spaced notches 120 thereon, which notches engage the walls of the drum as the skewer is inserted. Since the skewer legs have a spring action, and since the spacing of the legs is preferably either somewhat wider than or somewhat narrower than the corresponding spacing of the openings within the drum, a frictional spring-like detent engagement is assured between the legs of the skewer and the drum openings by means of which the skewer is self-holding until released by extracting or pulling on the loop 114 by inserting a finger through the opening 115. A plurality of the skewers 110 may be employed at desired positions along the peripheral surface of the drum, as required, to secure the animal or food products to be roasted.

Figure 8:
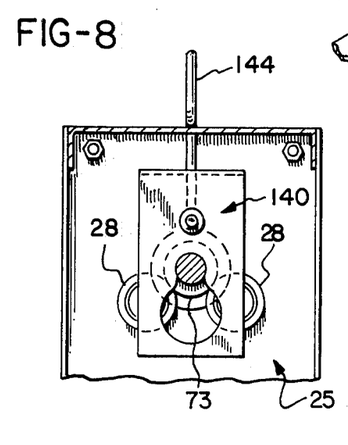
FIG. 8 is a fragmentary view, partially in section, showing the latching mechanism for retaining the spit shaft on the motor drive shaft.
Figure 9:
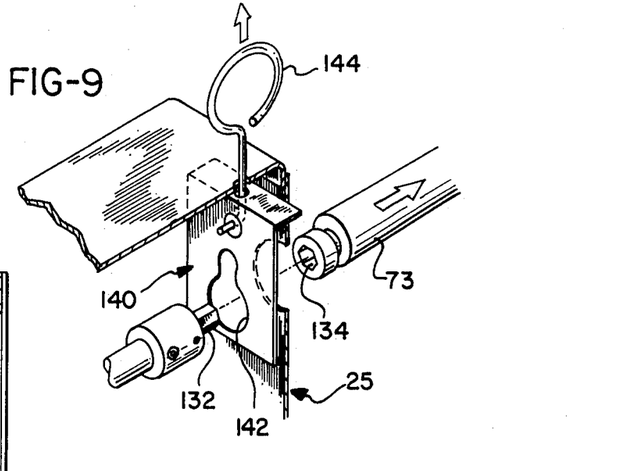
FIG. 9 is a perspective exploded view showing the relationship of the latch mechanism with the spit and the drive motor shaft and the end support.

Means for driving the spit 70 includes a gear reduction motor assembly 130 mounted on the outer vertical surface of the end support 25. The gear reduction motor is provided with a hexagonal drive 132 at the end thereof, as shown in FIG. 9, which may be inserted within a corresponding socket 134 threaded into the end of the skewer rod 73. A simple keeper plate 140 has a keyhole-shaped slot 142 therein, positioned between the gear reduction drive and the adjacent outer surface of the end support 25, is shown in FIGS. 8 and 9, and a keyring loop 144 is connected thereto by means of which the plate 140 may be raised to release the spit or lowered to lock the spit in place in driving relation, with the hexagonal driver 132 received within the corresponding cavity formed in the socket 134. The enlarged opening of the key slot 142 is proportioned to receive the socket 134 therein, and the smaller necked down portion is received between the socket and the end of the rod 73 when the key plate 140 is in a lowered position, as shown in FIG. 8. The spit may be quickly released simply by raising or lifting on the loop 144, lifting the plate 140 and extracting the rod and spit.

The remote end of the rod 73, on the opposite side of the support 24, carries an adjustable offset counterbalance weight 150. The weight 150 is adjustable by means of a rod 152 received through a coupling clamp 154 on the rod 73, by means of which the relatively offset position of the weight 150 and the degree of extension of the weight from the center line, may be easily controlled, so that the food product, sucn as a pig, carried on the spit, may be effectively counterbalanced to remove uneven loading from the gear reduction drive motor. The position and the extent of counterbalance can readily be adjusted, when the drive motor is uncoupled, as shown in FIG. 9, by positioning the coupling clamp 154 on the rod 73 and positioning the weight 150 to achieve a balanced condition.

The entire roasting machine is covered by a generally U-shaped inverted hood or shield 160. The shield is formed of sheet metal and carried on U-shaped tubular frame members 162, the ends of which may be received over vertically extending tabs 163 formed on the end supports. The hood 160 may be removed simply by lifting, to obtain access to the spit. When in position, it serves to confine the smoke to enhance flavoring and to enhance the cooking.

Since the drum of the spit is hollow, it tends to maintain a uniform inner air temperature which is transmitted to the food. The flavor of additives, released by the heat, may escape through the open unused holes of the drum into the food. The hood 160 has the further effect of reflecting heat back to the food, and to permit the smoke to linger long enough to add flavor. A condiment shelf 170 may be positioned rearwardly of the support 25 and mounted between the frame members 12 and 14 to form a convenient tray for the home owner or operator. Further, an optional grill 175, FIGS. 1 and 2, may be inserted for conventional grilling of hamburgers or the like, when the rotisserie is not required. It may be left in place, if desired, during rotisserie operation, but is preferably removed as it may otherwise form a heat shield which may block some of the heat from the fire bed or coals in the firebox 50.

The operation of the roaster apparatus as described above is considered to be largely self-evident from the foregoing description. The drum 72 of the spit 70 may be readily removed from the rod 73 for cleaning, by loosening the screws 88 of the clamp 75. The entire spit may be quickly inserted or removed from the roaster apparatus, by raising the hood 160, and lifting the keyplate 140, permitting the spit to be removed or inserted on the rotisserie apparatus. The amount of heat directed and the rate of cooking may be controlled by suitably positioning the damper plate 64 within the firebox 50, to control the rate of burning of the charcoal or other fuel therein, and the entire firebox may be positioned by raising or lowering on the notches 32 formed in the supports, by lifting on the ends 44 of the handlebars 40. As noted, condiments of various kinds may be placed into the hollow interior of the drum prior to cooking. Skewers 100 may be used to put a large quantity of various meat or vegetable products to be cooked, such as shish kebab, chicken parts or the like, onto the exterior of the hollow drum, or may be used to hold a small suckling pig, as illustrated in the drawings.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a roasting machine for roasting relatively large items of food, such as small pigs or the like, on a rotating roasting spit, the improvement comprising:
    a frame including a pair of side frame members extending in generally parallel relation and having means forming ground-engaging ends at each end thereof,
    a pair of transversely spaced-apart, generally upstanding end supports extending between said side frame members,
    an ash pan interconnecting said frame members and positioned longitudinally thereon between said frame members,
    a generally rectangularly-shaped firebox proportioned to be received between said supports,
    a pair of handlebars having an intermediate portion receivable in supporting relation to opposite sides of said firebox and having hand gripping ends,
    means on said end supports defining pairs of vertically spaced handle bar receiving notches by means of which said handlebars may be suspended at varying elevated positions on said end supports, to suspend said firebox therebetween at correspondingly selected elevated positions,
    an elongated rotisserie spit,
    means on said end supports for rotatably receiving said spit longitudinally therebetween in elevated relation to said firebox, and
    motor means on one of said end supports for driving said spit.

2. The roasting machine of claim 1 further comprising an inverted generally U-shaped hood, and means mounting said hood on said end supports in overlying relation to said spit.

3. The roasting machine of claim 1 in which said firebox has means defining a pair of ends, said sides sloping outwardly and joining said ends, a bottom joining said sides and end having means therein defining a pattern of vent holes, a damper plate proportioned to be received adjacent said bottom having means therein defining a plurality of damper holes therein positioned generally in a pattern corresponding to the pattern vent holes in said bottom, said damper plate having a length which is somewhat less than said bottom permitting said damper plate to be moved to bring said damper holes therein in selective registration with said vent holes, and a grate received in superimposed relation to said damper plate for supporting coals thereon.

4. The roasting machine of claim 1 in which said rotisserie spit includes a hollow longitudinally extending cylindrical drum, a support shaft extending axially through said drum, clamp means mounting said drum to said shaft, means in said drum defining a plurality of skewer-receiving openings extending into the interior thereof, said drum providing a hollow interior space to receive condiments, spices, and the like.

5. The machine of claim 4 further comprising means defining a plurality of generally H-shaped skewers each having a pair of spaced-apart elongated legs adapted to be received by insertion through a corresponding pair of said drum openings with a portion of each of said skewers positioned externally of said drum for retaining meat or other food products adjacent to the outer surface of said drum.

6. The machine of claim 4 further comprising counterweight means on said shaft, clamp means for securing said counterweight means in position to compensate for uneven loading on said drive motor caused by uneven weight distribution of food on said spit.

7. In a rotisserie having a motor driven shaft and means mounting said shaft for rotation above a fire pit, the improvement comprising:
- a generally cylindrical axially elongated drum received on said shaft,
- a pair of clamp means removably mounting said drum to said shaft adjacent the axial ends of said drum,
- means in said drum defining a plurality of opening extending through the wall thereof for the reception of legs of skewers.

8. The improvement of claim 7 in which said clamp means comprises a plurality of annular hub plates received over said shaft with an inner opening thereof forming a close fit with said shaft and with the outer diameter thereof received within said drum and forming a relatively close fit thereto, and means pivotally connecting said hub plates together at one radial offset position with respect to the center line of said shaft, and screw and nut means having one portion thereof engageable with at least one of said plates and another reaction portion thereof engageable with another of said plates at a region remote from said offset position, whereby said plates are caused to rotate about said pivotal connecting means for clamping onto said shaft and against the interior surface of said drum.

9. A clamp mechanism for connecting a cylinder to a rod extending generally coaxially of said cylinder, comprising:
- at least two stacked, disc-shaped annular plates each having a common central opening adapted to be received over said rod in relatively close non-interferring relation therewith, and each having an outer diameter adapted to be received in an open end of said cylinder,
- pivot means interconnecting said plates for movement one to the other about a pivot point which is laterally offset from the axis of said cylinder,
- screw and nut means interconnecting each of said plates adjacent a peripheral region thereof remote from said pivot means and operable to cause relative pivotal movement of said plates about said pivot means for camming said plates onto said shaft at said central opening and simultaneously locking the periphery of said plates into engagement with said cylinder.

10. The clamp mechanism of claim 9 in which there are four of said plates comprising two inner plates and two outer plates and in which said nut means engages said two outer plates and said screw means engages the two inner plates whereby the pair of inner plates are biased in one pivotal direction about said pivotal connection and said outer plate pairs are biased in the opposite direction about said pivotal connection.

11. A roasting machine for roasting relatively large items of food, such as small pigs or the like, on a rotating roasting spit, comprising:
- a frame including a pair of side frame members extending in generally parallel relation,
- a pair of transversely spaced-apart, generally upstanding end supports extending between said side frame members,
- a generally rectangularly-shaped firebox proportioned to be received between said supports,
- a pair of handlebars having an intermediate portion receivable in supporting relation to opposite sides of said firebox and having hand gripping ends,
- means on said end supports defining pairs of vertically spaced handle bar receiving notches by means of which said handlebars may be suspended at varying elevated positions on said end supports, to suspend said firebox therebetween at correspondingly selected elevated positions,
- an elongated rotisserie spit,
- means on said end supports for rotatably receiving said spit longitudinally therebetween in elevated relation to said firebox, and
- motor means on one of said end supports for driving said spit.

12. The roasting machine of claim 11 in which said rotisserie spit includes a hollow longitudinally extending cylindrical drum, and means in said drum defining a plurality of skewer-receiving openings extending into the interior thereof, said drum providing a hollow interior space to receive condiments, spices and the like.

13. The roasting machine of claim 12, further comprising an inverted generally U-shaped hood, and means mounting said hood on said end supports in overlying relation to said spit.

* * * * *